June 24, 1941. J. KOLBE Re. 21,840

MOTOR VEHICLE

Original Filed Dec. 26, 1935

INVENTOR
Joachim Kolbe

BY Bryant & Lowry
ATTORNEYS.

Reissued June 24, 1941 Re. 21,840

UNITED STATES PATENT OFFICE 21,840

MOTOR VEHICLE

Joachim Kolbe, Detroit, Mich.

Original No. 2,072,521, dated March 2, 1937, Serial No. 56,268, December 26, 1935. Application for reissue February 18, 1939, Serial No. 257,119. In Germany December 28, 1934

2 Claims. (Cl. 280—112)

This invention relates to motor vehicles and in particular to the connections between the upper carriage body and the wheels of a motor vehicle. The invention is particularly applicable to motor vehicles of the type known as curve compensating vehicles wherein by a special construction of the connection between the wheels and the upper body of the vehicle, the said upper body, when under the influence of lateral forces, such as centrifugal force, is capable of adjusting itself at such an inclination, that the passengers in the vehicle do not notice the said forces. Such vehicles are particularly advantageous in travelling around corners.

In the hitherto proposed constructions of such curve compensating vehicles, the upper carriage body has been connected to the lower carriage consisting of a frame on which the wheels are suspended with the interposition of springs, by inclined links the pivotal connections of which on to the upper carriage body are set closer together than on the lower frame, and which can move only transversely to the longitudinal axis of the vehicle. In order, in these embodiments, to obtain the necessary strength of the upper carriage body, this must also be reinforced or strengthened by a frame. This double arrangement of frames both on the upper carriage body and on the under-carriage results, however, in an unfavorable increase in weight which is undesirable.

The present invention has for its object to provide an improved connection between the upper carriage body and the wheel axles of a motor vehicle whereby the connection is of minimum weight and also permits the maximum free movement between the axles of the vehicle.

Another object of the invention is to provide an improved connection between the upper carriage body and the wheel axles of a motor vehicle whereby it is possible to dispense with a strengthening frame connecting the wheel axles together, thereby permitting a maximum free movement between the axles of the vehicle, and at the same time increase the safety of the vehicle when travelling around curves without the use of any complicated structure which might add unduly to the weight of the vehicle.

In carrying the invention into practice, the connection of the upper carriage body of the vehicle to the wheel axles is effected in such a manner that a strengthening frame for the wheel axles is dispensed with. The upper carriage body is preferably strengthened by a frame and may be swung into any inclined position necessitated by the travelling of the vehicle around a curve, by means of link members directly attached to the axles and by the axles not being connected between themselves. In addition to the saving in weight thereby attained, there is also attained the possibility of a more free relative movement of the axles which is of particular importance in travelling over rough ground. A vehicle in accordance with the invention is, therefore, particularly suitable for driving in uneven country.

Attempts have already been made to support the upper carriage body of curve compensating vehicles only on the axles of the vehicle, but to this end, complicated combined link systems have been employed with the object of attaining at the same time, on the outward thrust of the carriage body a rising of the center of gravity of the upper frame so that after being swung out, the said upper frame returns automatically into the normal position. By means of these combined link systems, however, the rigidity of the system is prejudicially affected and an exceptionally large number of link bearings and sliding surfaces are necessary. In practice, with such constructions it has not been possible to dispense with a frame between the axles or with some other connection which affects the adaptability of the vehicle for travelling over rough ground.

If there are provided, on the contrary, and according to the invention, only simple link members between the upper carriage body and the individual wheel axles, so that during the swinging out of the upper carriage body a lowering of the center of gravity is obtained, and springs are also provided which return the carriage body to the normal position, the whole attachment can be designed so simply and robustly that a separate frame for the wheel axles is unnecessary. The lowering of the center of gravity when travelling around a curve means an increase in safety at a moment normally of danger, since the height of the center of gravity is of no importance when travelling in a straight line.

It is, however, also possible according to the invention in order to avoid the lowering of the center of gravity to suspend the upper carriage body to the wheel axles by inclined link members in such a manner that the points of connection of the link members on the upper carriage body are lower than the points of connection on the wheel axles and are set wider apart than those on the axles. In this case, return springs can also be dispensed with.

The invention will be more clearly understood from the detailed description of two preferred embodiments thereof which is given hereinafter, by way of example, with reference to the accompanying drawing, in which.

Figure 1:
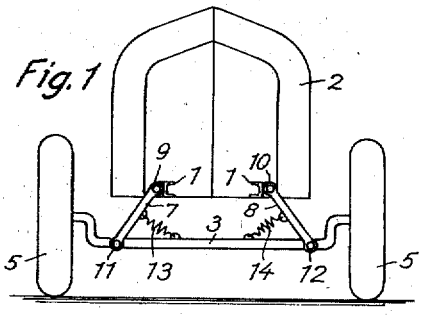
Figure 1 shows a front view of a motor vehicle provided with an upper carriage which is supported on the wheel axles by means of a connection in accordance with the invention.
Figure 2:
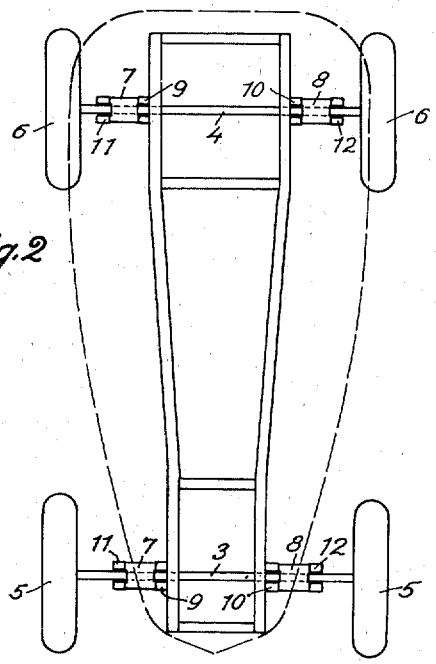
Figure 2 is a plan view corresponding to Figure 1.

In the construction according to Figures 1 and 2 the upper part of the vehicle comprises a frame 1 which is formed in the usual manner of longitudinal and transverse supports and carries the engine, the driving gears and also the carriage body 2. The chassis of the vehicle consists of the individual wheel axles 3 and 4 which carry, respectively, the front wheels 5 and the rear wheels 6.

The connection between the upper part of the vehicle and the chassis is effected by inclined link members 7 and 8, the upper pivotal points 9 and 10 of which are so connected to the frame 1 and their lower pivotal points 11 and 12 so connected to the wheel axles 3 and 4, that the said members are free to move only in a plane perpendicular to the longitudinal axis of the vehicle, there being complete rigidity in the longitudinal direction. The pivotal points may consist of socket-like extensions of the end of the link members and corresponding socket-like projections on the frame 1, and also on the wheel axles 3, 4, the sockets being held together by means of bolts. Between the link members 7 and 8 and the wheel axles 3 and 4, springs are provided which are tensioned when the carriage body 2 swings outwardly and thus act to return the same into the normal position as soon as the forces which have caused the outward swinging have disappeared.

As can clearly be seen from Figures 1 and 2, due to the mutual independence of the front axle 3 and the rear axle 4, shocks which act on the one axle are not transmitted to the other axle and consequently, on the contrary to the constructions hitherto proposed, a smoother movement of the vehicle is obtained on uneven ground, that is to say, that the vehicle is particularly well adapted for use over rough land.

Figure 3:
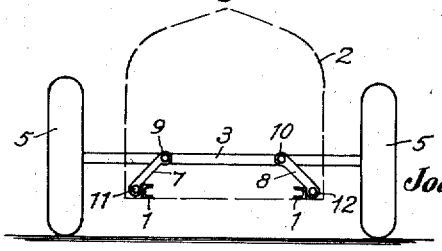
Figure 3 is a front view of a second embodiment in which the upper carriage is suspended to the wheel axles by means of a connection in accordance with the invention.

The same advantage is also given with the embodiment according to the invention illustrated in Figure 3, in which the upper carriage 1, 2 is suspended to the wheel axles 3, 4 by the link members 7, 8. The link connections may be formed in the same way as described above in connection with Figure 1. The upper pivotal points 9, 10 of the links are set again closer together than the lower pivotal points 11, 12, but with the difference that the upper pivotal points 9, 10 are connected to the wheel axles 3, 4, whilst the lower ones on the contrary, are connected to the frame 1 of the upper carriage body. A further difference in this embodiment consists in that the springs which were necessary in the embodiments according to Figure 1, may now be dispensed with since when the carriage body 1, 2 swings outwardly, its center of gravity rises so that it can return of itself into the normal position.

It will be understood that both the embodiments according to the invention above described offer the advantage that the center of gravity of the whole vehicle may be located very low and that nevertheless not only a swinging out of the carriage body can take place when travelling around curves or under the influence of other lateral forces, but that in addition there is obtained great adaptability for travelling over rough land.

It will also be understood that the invention is in no way restricted to the specific details described above with reference to the accompanying drawing and that many modifications of the said specific embodiments may be made within the scope of the appended claims.

What I claim and desire to secure by Letters Patent is:

1. In a motor driven vehicle wherein the body thereof is adapted to assume an inclined position while travelling through curves on a road, means for suspending the carriage body to the wheel axles of the vehicle comprising a plurality of single inclined rigid link members pivotally connected at the top directly to the wheel axles and at the bottom directly to the carriage body, the upper pivotal points on the wheel axles being set closer together than the lower pivotal points on the carriage body and said link members being movable only in a plane perpendicular to the longitudinal axis of the vehicle, said link members constituting a sole and direct connection between said carriage body and wheel axle for the support of the carriage body.

2. In a motor vehicle having front and rear axles, a body, connecting means between the body and axles comprising angularly disposed rigid links pivotally connected longitudinally of the vehicle at their lower end to the body and at their upper end to the axles, the transverse distance between the ends of the links connected to the body remaining constant and the transverse distance between the ends of the links connected to the axles remaining constant, the upper ends of said links being closer together than the bottom ends whereby the body will assume an inclined position towards the inside of the curve relative to the axles accompanied by a raising of the center of gravity of the body relative to the axles when subjected to lateral forces as the vehicle rounds a curve.

JOACHIM KOLBE.